(12) United States Patent
Deane et al.

(10) Patent No.: US 6,364,542 B1
(45) Date of Patent: Apr. 2, 2002

(54) DEVICE AND METHOD FOR PROVIDING A TRUE SEMICONDUCTOR DIE TO EXTERNAL FIBER OPTIC CABLE CONNECTION

(75) Inventors: Peter Deane, Los Altos; Chen-Hui Tsay, San Jose; Cade Murray, Fremont; Luu Nguyen, Sunnyvale, all of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/568,094

(22) Filed: May 9, 2000

(51) Int. Cl.[7] .................................................. G02B 6/36
(52) U.S. Cl. ............................. 385/92; 385/88; 385/90
(58) Field of Search ...................................... 385/88–94

(56) References Cited

U.S. PATENT DOCUMENTS 5,515,467 A * 5/1996 Webb .......................... 385/88
5,590,232 A * 12/1996 Wentworth et al. ............ 385/92

FOREIGN PATENT DOCUMENTS

GB 2276033 A * 9/1994 .................. 385/92

* cited by examiner

*Primary Examiner*—Phan T. H. Palmer
(74) *Attorney, Agent, or Firm*—Beyer Weaver & Thomas, LLP (57) ABSTRACT

A low cost device that provides a true die to external fiber optic connection. The device includes a semiconductor die having a first surface, an integrate circuit fabricated on the first surface of the semiconductor die and a package encapsulating the semiconductor die. The device also includes a module mounted onto the package and configured to receive an external fiber optic cable. An opto-electric device, housed in the module is optically coupled to the fiber optic cable when the cable is inserted into the module. To provide the direct die to external fiber optic connection, at least one electrical conductor is provided between the integrated circuit fabricated the semiconductor die, through the package and module, and directly to the opto-electrical device.

25 Claims, 6 Drawing Sheets

DEVICE AND METHOD FOR PROVIDING A TRUE SEMICONDUCTOR DIE TO EXTERNAL FIBER OPTIC CABLE CONNECTION

BACKGROUND OF THE INVENTION

1. Field of the Invention

The present invention relates to semiconductor packages, and more particularly, to a semiconductor package assembly that provides a true die to external fiber optic cable connection.

2. Description of the Related Art

Most computer and communication networks today rely on copper wiring to transmit data between nodes in the network. Since the data transmitted over the copper wire and the data processed within the nodes are both represented in the form of electrical signals, the transfer of data at the node-copper wire interface is straight forward. Other than perhaps a level shift and a signal amplification, no other signal processing is required for data transmitted over the copper wire to be decoded by the node. The drawback with using copper wire is its relatively low bandwidth. Copper's ability to transmit data is significantly limited compared to other mediums, such as fiber optics. Accordingly much of the computer and communication networks being built today, including the Internet, are using fiber optic cabling instead of copper wire.

With fiber optic cabling, data is transmitted using light signals, not electrical signals. For example, a logical one may be represented by a light pulse of a specific duration and a logical zero may be represented by the absence of a light pulse for the same duration. In addition, it is also possible to transmit at the same time multiple colors of light over a single strand of optic fiber, with each color of light representing a distinct data stream. Since light is attenuated less in fiber than electrons traveling through copper, and multiple data streams can be transmitted at one time, the bandwidth of optic fiber is significantly greater than copper.

While fiber optic cabling is very efficient for transferring data, the use of light signals to process data is still very difficult. Data is typically transferred and stored in various locations before, during and after it is operated on in a computer. There still is no efficient way to "store"light signals representative of data. Networks will therefore likely continue using fiber optics for transmitting data between nodes and silicon chips to process the data within the nodes for the foreseeable future. The interface between the fiber optic cable and the nodes that process the data is therefore problematic because signals need to be converted between the electrical and the light domains.

Fiber optic transceivers, which convert light signals from a fiber optic cable into electrical signals, and vice versa, are used as the interface between a fiber optic line and a computer node. A typical transceiver includes a substrate, grooves etched in the substrate to receive the individual fiber optic strands, one or more semiconductor devices mounted on the substrate, one or more discrete optical detectors for converting light signals received over the fiber optic cables into electrical signals, one or more discrete optical transmitters for converting electrical signals from the semiconductor devices into light signals. A number of fiber optic transceivers are commercially available from Hewlett Packard, AMP, Sumitomo, and Lasermate Corporate. The problem with all of these fiber optic transceivers is that they are expensive and difficult to fabricate. With each transceiver, the semiconductor devices, transmitters, and optical detectors have to be individually mounted onto the substrate, which is a costly and time consuming process. This limits the applications in which optical interconnects versus copper. Furthermore the use of discrete transmitters and optical detectors adversely effects the performance of the transceiver because electrical parasitics between discrete components are sources of electrical attenuation of inter-chip signals at Gigabit per second speeds that are generally used with such transceivers, and power is consumed for driving these traces than would not be needed for an integrated device. The form factor of the on-board optical transceiver is relatively large and therefore does not facilitate inter-board and chip-to-chip optical interconnectability.

A low cost semiconductor device that provides a true die to external fiber optic connection is therefore needed.

SUMMARY OF THE INVENTION

The present invention provides a low cost device that provides a true die to external fiber optic connection. The device includes a semiconductor die having a first surface, an integrate circuit fabricated on the first surface of the semiconductor die and a package encapsulating the semiconductor die. At least one solder ball formed on the first surface of the die is exposed through the package encapsulating the die. The device also includes a module mounted onto the package and configured to receive an external fiber optic cable via either a direct "pigtail" connection or by use of an external connector. An opto-electric device, which can be either a transmitter and/or a detector, is housed in the module and is optically coupled to the fiber optic cable when the cable is inserted into the module. At least one electrical conductor is provided between the integrated circuit and the opto-electrical device. In one embodiment, the electrical conductor includes a post formed through the base of the module and which is in electrical contact between the opto-electric device and the solder ball formed on the surface of the semiconductor die, thus forming a true die to external fiber optic connection. In an alternative embodiment, the semiconductor die can have an array of the solder balls which can be used to form a plurality of true die to external fiber optic connections with additional opto-electric devices contained in the module.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
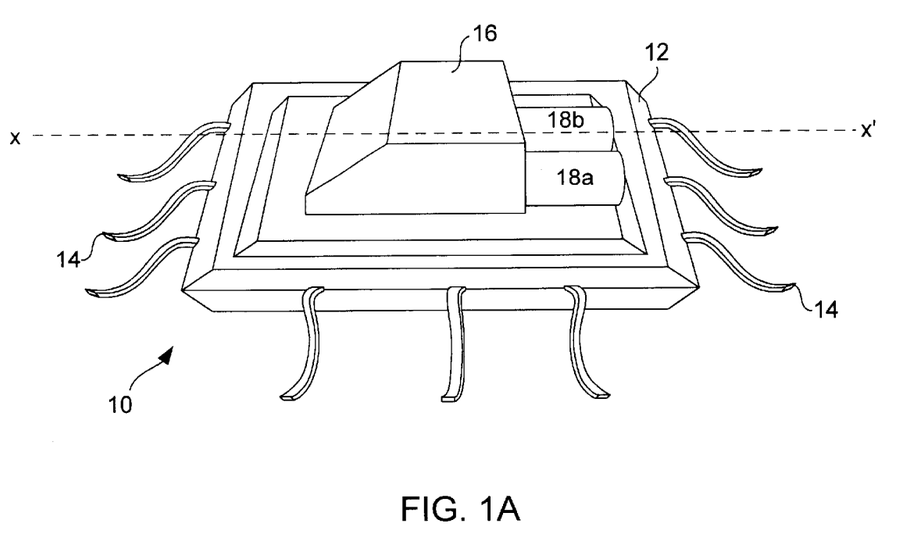
FIGS. 1A and 1B are a side and front perspective views of the device for providing a true semiconductor die to external fiber optic cable connection according to the present invention.
Figure 1B:
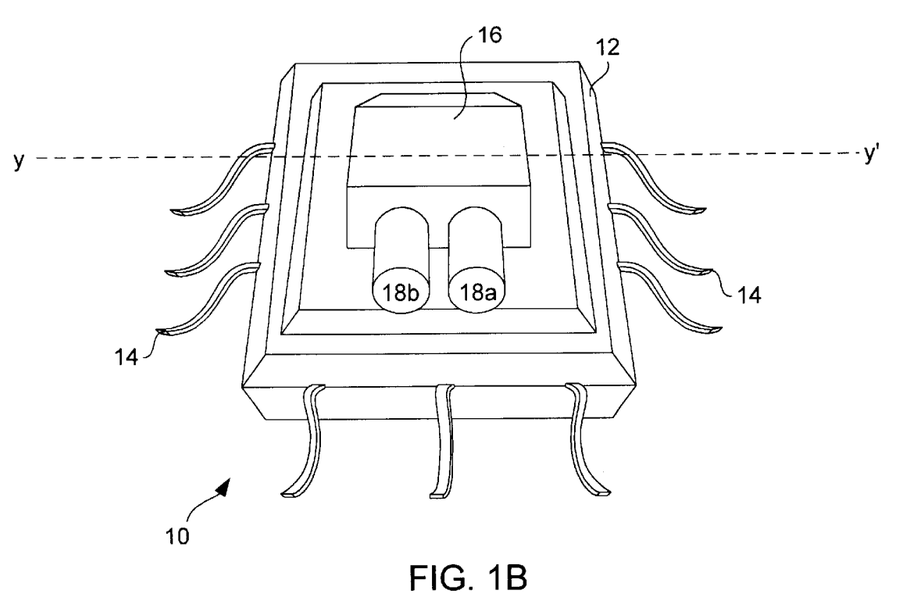

Referring to FIGS. 1A and 1B, a side and front perspective view of the device for providing a true semiconductor die to external fiber optic cable connection according to the present invention is shown. The device 10 includes a semiconductor package 12 encapsulating a die (not shown), and a plurality of leads 14 extending from the package 12. The leads 14 are configured to electrically couple the die in the package 12 to external circuitry on a printed circuit board (not shown) such as the mother board in a computer. A module 16 is mounted on the top surface of the package 12. The module 16 is configured to receive via a direct pigtail connection one or more external fiber optic cables 18a and 18b which couple the device 10 to a fiber optic network (not shown). In one embodiment, the fiber optic cable 18a is used to transmit data from the device 10 to the network and fiber optic cable 18b is used to receive data from the network at the device 10. In alternative embodiments, fiber optic cables 18 can be used to either both transmit or receive data or more than two fiber optic cables can be used to transmit and/or receive data between the device 10 and the network.

Figure 2:
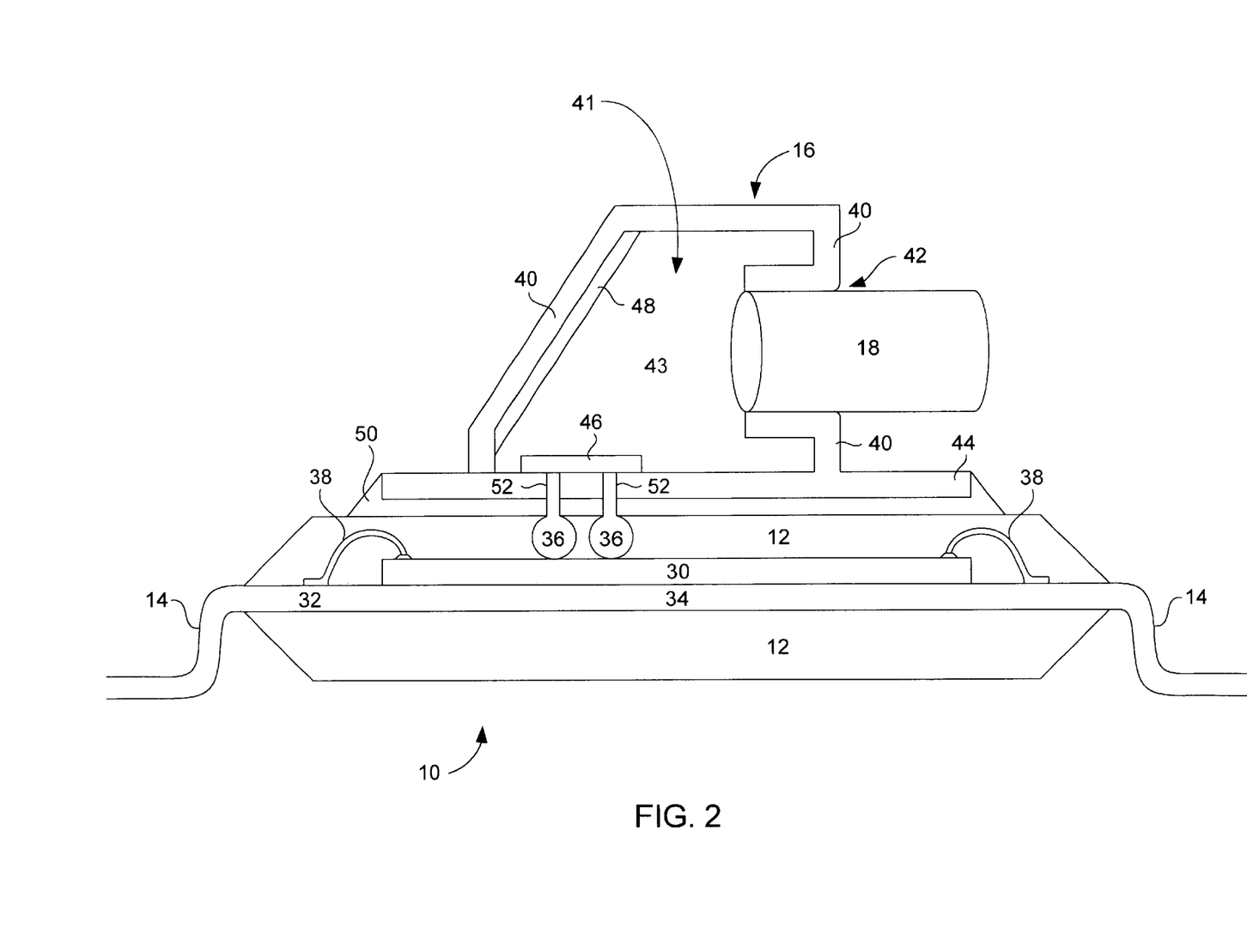
FIG. 2 is a cross section view of the device of FIG. 1A along line $(x-x^1)$ according to one embodiment of the present invention.

Referring to FIG. 2, a cross section view of the device 10 along line ($x$–$x^1$) of FIG. 1A is shown. The cross section shows the internal features of the package 12 and the module 16.

The cross section view of the package 12 shows a semiconductor die 30, a lead frame 32 including a die pad 34 for supporting die 30, and the plurality of leads 14. A plurality of solder balls 36 are located on the top surface of the die 30 to provide electrical contact to contact pads (not shown) on the die 30. The solder balls 36 extend upward from the die 30 so that they are exposed through the top surface of the package 12. Bond wires 38 are used to electrically couple the die 30 to the leads 14 of the lead frame 32. A detailed description of this package arrangement is provided in co-pending commonly assigned U.S. Pat. application Ser. No. 09/568,558, entitled "An Arrayable, Scalable, and Stackable Molded Package Configuration" filed on the same day as this application, and incorporated by reference herein for all purposes.

The cross section also shows the module 16 having external walls 40 which define an internal chamber 41 within the module, one or more receptacles 42 each for receiving a fiber optic cable 18, and a base 44 for supporting the module. The internal chamber 41 is substantially filled with a translucent material 43 or is a vacuum. An opto-electrical device 46 is positioned on the base 44 and housed within the chamber 41. A mirror 48 is provided within the chamber 41 and is used for directing light signals from the fiber optic cable 18 to the opto-electric device 46 or for directing light signals generated by the opto-electrical device to the fiber optic cable 18, depending on whether the opto-electric device 46 is a receiver or a transmitter respectively. An adhesive 50 is provided between the base 44 and the top surface of the package 12 and is used to secure the module 16 to the package 12. Electrically conductive posts 52 which pass through vias formed in the base 44 of the module 16 are used to provide an electrical contact with the solder balls 36 exposed along the top surface of the package 12. Thus the posts 52 and solder balls 36 provide a true electrical connection between the opto-electric device 46 and the die 30.

In various embodiments of the present invention, the walls 40 of the module 16 are made of an opaque material such as plastic, metal, or any other material that prevents light from entering the chamber 41 and that protects the contents of the module 16. The base 44 is made from an electrically insulative, thermally conductive, low cost, rigid material such as ceramic or polycarbonate. The translucent material 43 can be any material that is transparent to light signals used in fiber optic communication systems, such asplastics, acrylic, polycarbonate, or any other type of transparent, stable material. The translucent material 43 can be formed from a moldable material poured and cured within the chamber 41 or it can be machined from a solid piece of one of the above-mentioned materials. The mirror 48 can be made of any type of reflective material, such as aluminum or silver, deposited on the translucent material 43 or wall 40.

While the cross section of FIG. 2 shows only one opto-electric device 46, it should be understood that a plurality of opto-electric devices 46, each being associated with a fiber optic cable 18 and mirror 48, can be housed within the chamber 41. In alternative embodiments, the opto-electric devices 46 can be either detectors that convert light signals received from the fiber optic cable 18 into electrical signals, transmitters that generate light signals in response to electrical signals received from the die 30, or any combination of both. For a detector, any type of commercially available band gap element capable of generating free electrons in response to light signals may be used. Similarly any commercially available transmitter such as an LED, edge emitting laser (EEL), or vertical cavity surface emitting laser may be used.

Figure 3A:
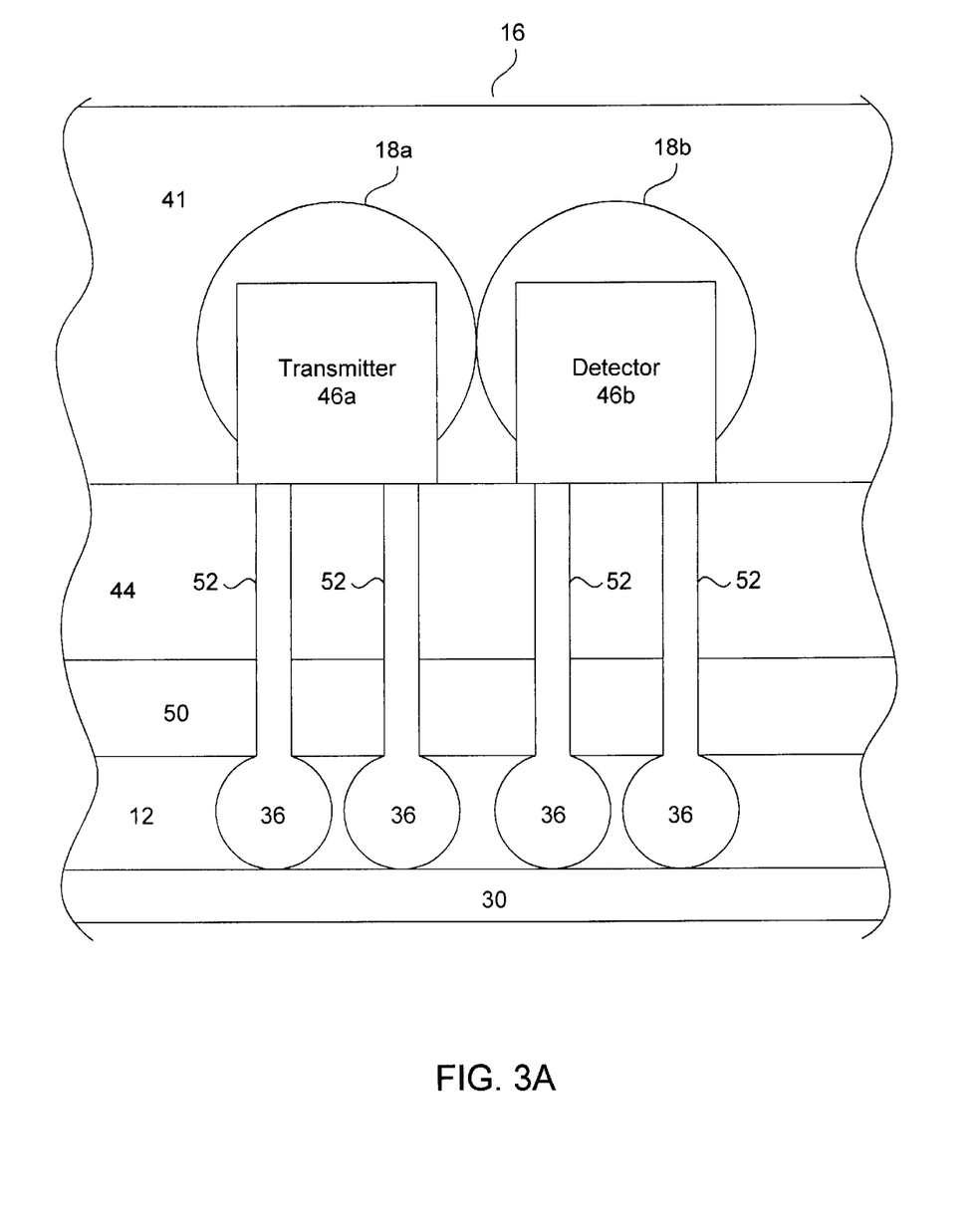
FIG. 3A is a cross section of the device of FIG. 1B including an opto-electric transmitter and detector along line $(y-y^1)$ according to another embodiment of the present invention.

Referring to FIG. 3A, a rear cross section view of the device 10 along line ($y$–$y^1$) of FIG. 1B according to an alternative embodiment of the present invention is shown. In this embodiment, two opto-electric devices 46a and 46b are shown in the chamber 41 of the module 16. For the sake of illustration, the first opto-electric device 46a is a transmitter and the second opto-electric device 46b is a detector. Alternatively one or more opto-electric devices 46 of either type may be used. The two opto-electric devices 46a and 46b are optically coupled directly to the fiber optic cables 18a and 18b respectively. The posts 52, which pass through the base 44 of the module 16, the adhesive 50, and contact the solder balls 36, provide a direct electrical connection between the opto-electric devices 46 and the die 30. Accordingly, with this embodiment, the translucent material 43 and the mirror 48 for each opto-electric device 46 can be removed from the chamber 41 of the module 16, thus reducing cost and complexity.

Figure 3B:
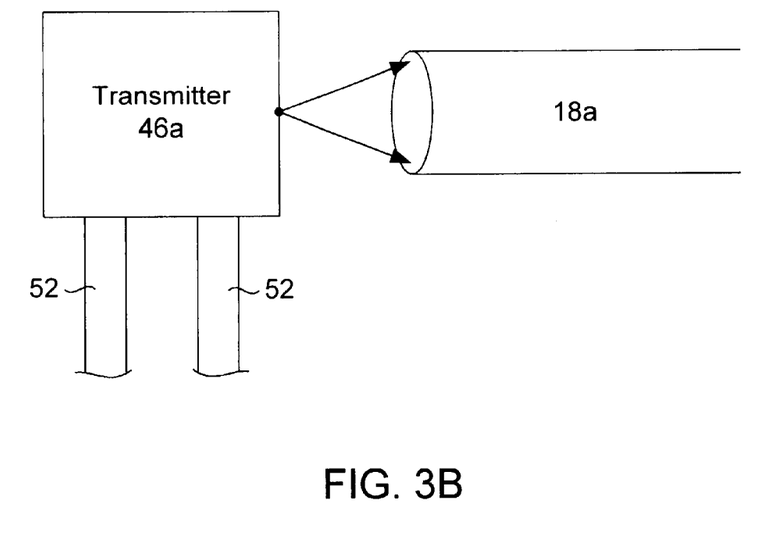
FIGS. 3B and 3C are perspective views of the transmitter and detector according to the embodiment of the invention shown in FIG. 3.
Figure 3C:
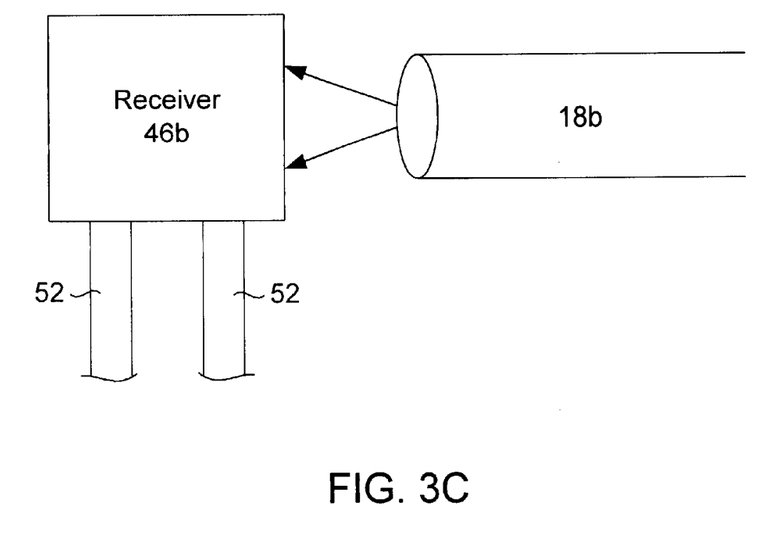

Referring to FIG. 3B, a cross section view of the transmitter 46a of FIG. 3 is shown. The transmitter 46a generates light signals which are focused directly into the receiving end of the fiber optic cable 18a to optically couple the transmitter 46a and to cable 18a. Similarly in FIG. 3C, a cross section view of the receiver 46b is shown. The receiver 46b is configured to receive light signals directly from the fiber optic cable 18b to optically couple the cable 18b to the receiver 46b. Again since the opto-electric device 46a and 46b are optically coupled to the fiber optic cables 18a and 18b respectively, the use of the mirror 48 can be removed from the chamber 41 of the module 16.

Figure 4:
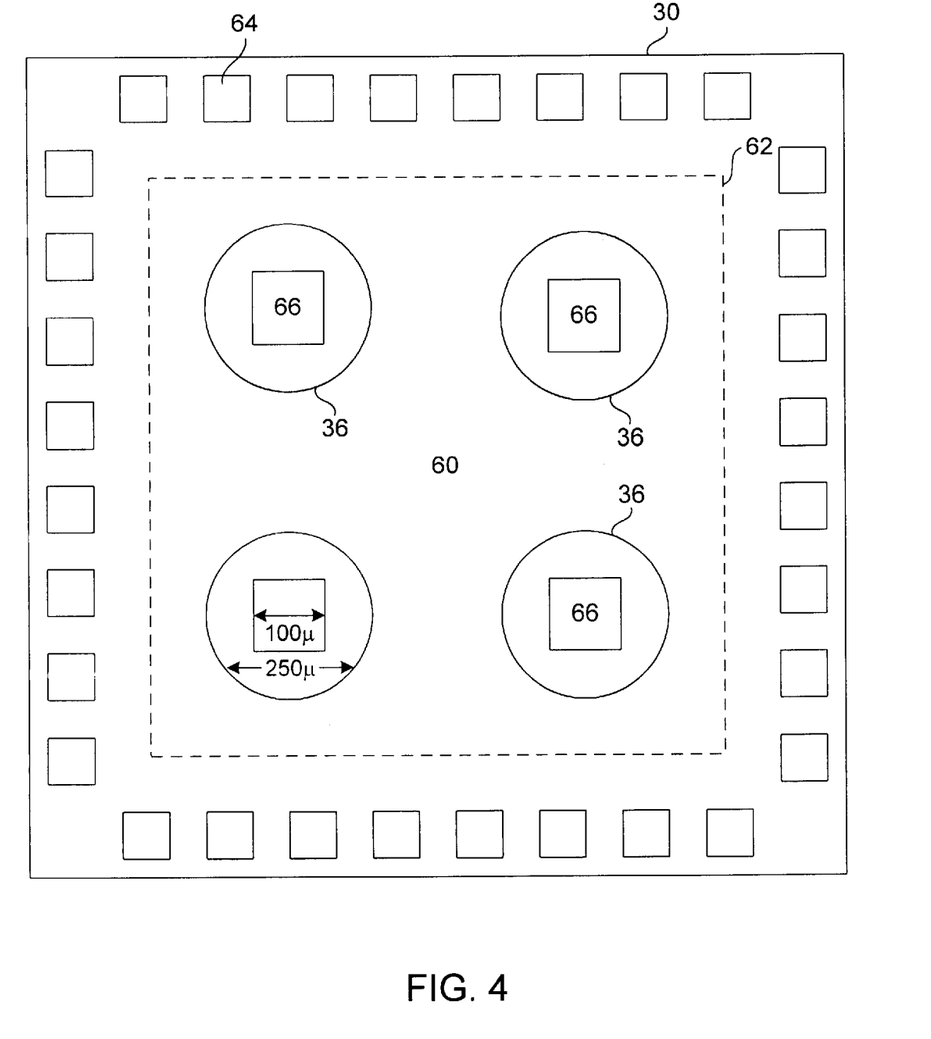
FIG. 4 is a floor plan of semiconductor die contained in the device of the present invention.

Referring to FIG. 4, a floor plan of die 30 encapsulated in the package 12 is shown. The die 30 includes an integrated circuit 60 fabricated in the core region (denoted by dashed line 62) of the die 30. Note for the sake of clarity, the details of the circuitry 60 are not illustrated. In accordance with various embodiments, the integrated circuit 60 is designed to perform a number of functions, including but not limited to data serialization, deserialization, photodetecter amplication, and timing recovery circuits. A plurality of die pads 64 are located along the periphery of the die 30. The die pads 64 are used to electrically couple the die 30 to the leads 14 of the package 12 via the bond wires 34. A plurality of contact pads 66 are located in the core silicon area and are electrically connected to specific circuits within the integrated circuit 60. The solder balls 36 are formed directly over the contacts pads 66. Thus electrical signals can be provided directly between the integrated circuit 60 on die 30 and the opto-electrical devices 46 in the module 16. In one embodiment, the device 10 is designed to implement an industry standard simplex transceiver with one opto-electrical device 46 configured as a receiver and a second opto-electrical device 46 configured as a transmitter. With this arrangement, a total of four electrical conductors (two per device 46) is needed, each including a contact 66, a solder ball 36, and a posts 52. In other embodiments with more or less opto-electrical devices 46, either more or fewer conductors are needed. In one embodiment, the contact pads 66 have a pitch of 100 microns, the solder balls have a pitch of 250 microns center-to-center, and the spacing between the contact pads 66 is approximately 500 microns. It will be appreciated by those skilled in the art that these dimensions are only exemplary and may vary according to a number of factors, such as the size of the die 30, the number of needed conductors, the pitch of the fiber optic cables 18, the pitch of the posts 52, the geometry of the transistors on the die 30, and other well known considerations.

Figure 5:
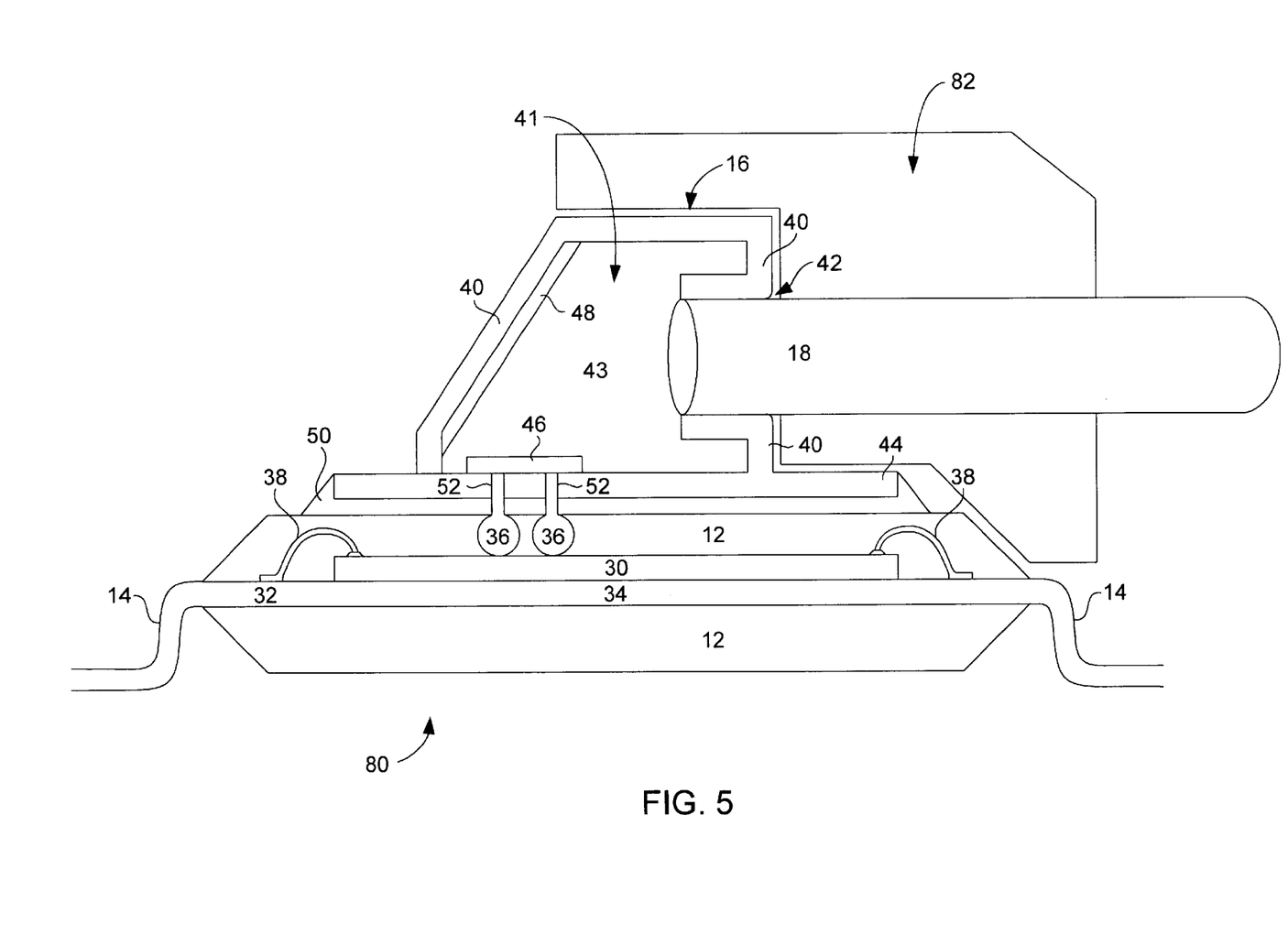
FIG. 5 is a cross section view of another opto-electric device according to another embodiment of the present invention.

Referring to FIG. 5, a cross section of another opto-electric device according to another embodiment of the present invention is shown. In this embodiment, the device 80 is configured to receive an external connector 82 which is used to "snap-fit" or other wise mechanically mount onto the module 16 to hold in place one or more fiber optic cables 18 in the receptacles 42 of the module 16. Like elements that perform the same or a similar function with the embodiments shown in FIG. 2 and FIG. 5 are designated with the same reference numerals and therefore are not described in detail herein.

While the invention has been described in relationship to the embodiments shown in the accompanying figures, other alternatives, embodiments and modifications will be apparent to those skilled in the art. It is intended that the specification be only exemplary, and that the true scope and spirit of the invention be indicated by the following claims.

What is claimed is:

1. An apparatus comprising:
   a semiconductor die having a first surface;
   an integrate circuit fabricated on the first surface of the semiconductor die;
   a package encapsulating the semiconductor die;
   a module mounted onto the package, the module configured to receive an external fiber optic cable;
   an opto-electric device housed in the module; and
   at least one electrical conductor coupled between the integrated circuit fabricated on the first surface of the semiconductor die and the opto-electric device housed in the module.

2. The apparatus of claim 1, wherein the module further comprises a base configured to mount the module onto the package encapsulating the die.

3. The apparatus of claim 2, wherein the base further comprises at least one via configured to accommodate the at least one electrical conductor passing through the base.

4. A The apparatus of claim 2, wherein the base comprises an electrically insulative material.

5. The apparatus of claim 2, wherein the base comprises a thermally conductive material.

6. The apparatus of claim 1, wherein the opto-electric device is a transmitter configured to convert electrical signals generated on the integrated circuit and received via the at least one electrical conductor into light signals.

7. The apparatus of claim 6, wherein the transmitter is one of the following types of transmitters: a light emitting diode, an edge emitting laser, or a vertical carrier surface emitting laser.

8. The apparatus of claim 1, wherein the opto-electric device is a transmitter configured to be optically coupled directly to the external fiber cable when the external fiber cable is inserted into the housing.

9. The apparatus of claim 1, wherein the opto-electric device is a detector configured to be optically coupled directly to the external fiber cable when the external fiber cable is inserted into the housing.

10. The apparatus of claim 1, wherein the module further comprises an internal chamber configured to house the opto-electric device.

11. The apparatus of claim 10, wherein the module further comprises a second opto-electric device.

12. The apparatus of claim 1, wherein the opto-electric device is a detector configured to convert light signals received at the module into electrical signals and to provide the electrical signals to the semiconductor die via the at least one electrical conductor.

13. The apparatus of claim 12, wherein the detector comprises a band gap element configured to generate free electrons in response to being exposed to light.

14. The apparatus of claim 1, further comprising an adhesive between the base of the module and the package to secure the module to the package.

15. The apparatus of claim 1, wherein the at least one electrical conductor comprises a solder ball formed on the first surface of the semiconductor die.

16. The apparatus of claim 1, further comprising a mirror housed within the module, the mirror configured to direct light signals between the opto-electric device in the module and the external fiber optic cable when inserted into the module.

17. The apparatus of claim 1, further comprising a translucent material substantially occupying a chamber formed within the module.

18. The apparatus of claim 17, wherein the translucent material comprises one of the following types of translucent materials: plastic, acrylic, polycarbonate, or a transparent plastic.

19. The apparatus of claim 1, wherein module has an external surface comprising an opaque material.

20. The apparatus of claim 1, further comprising a plurality of electrical conductors coupled between the integrated circuit fabricated on the first surface of the die and the opto-electric device housed in the module.

21. The apparatus of claim 1, wherein the module is configured to receive the external fiber optic cable via a pigtail connection.

22. The apparatus of claim 1, wherein the module is configured to receive the external fiber optic cable using an external connector which mounts to the module.

23. A method comprising the steps of:
   encapsulating a semiconductor die with an integrated circuit fabricated thereon into a package;
   mounting a module housing an opto-electric device onto the package; and providing a direct electrical connection between the opto-electric device in the module and the integrated circuit fabricated on the semiconductor die by providing an electrical contact between the opto-electric device and the integrated circuit by passing an electrical contact through the module and the package where the module is mounted to the package.

24. The method of claim 23, wherein the step of providing the direct electrical connection further comprises the step of providing an electrically conductive post through the module and package.

25. The method of claim 23, wherein the step of providing the direct electrical connection further comprises the step of providing a conductive post electrically connected to the opto-electric device through the module and providing a solder ball on the surface of the die which contacts the post.

* * * * *